United States Patent
Kang et al.

(10) Patent No.: US 8,141,622 B2
(45) Date of Patent: Mar. 27, 2012

(54) CONSOLE AIR CONDITIONER FOR VEHICLE

(75) Inventors: Seong-Ho Kang, Daedeok-gu (KR); Yong Eun Seo, Daedeok-gu (KR); Sang-Chul Byon, Daedeok-gu (KR); Yong Sang Kim, Daedeok-gu (KR)

(73) Assignee: Halla Climate Control Corp., Daejeon (KR)

( * ) Notice: Subject to any disclaimer, the term of this patent is extended or adjusted under 35 U.S.C. 154(b) by 1227 days.

(21) Appl. No.: 11/663,564

(22) PCT Filed: Sep. 23, 2005

(86) PCT No.: PCT/KR2005/003150
§ 371 (c)(1), (2), (4) Date: Mar. 23, 2007

(87) PCT Pub. No.: WO2006/080631
PCT Pub. Date: Aug. 3, 2006

(65) Prior Publication Data
US 2008/0245501 A1    Oct. 9, 2008

(30) Foreign Application Priority Data
Sep. 24, 2004 (KR) .................. 10-2004-0076854

(51) Int. Cl.
*B60H 1/00* (2006.01)
(52) U.S. Cl. .......... 165/202; 165/42; 165/203; 165/204; 454/161
(58) Field of Classification Search .................. 165/42, 165/43, 202, 203, 204; 454/161
See application file for complete search history.

(56) References Cited

U.S. PATENT DOCUMENTS

| | | | | |
|---|---|---|---|---|
| 4,907,497 A | * | 3/1990 | Danieau | 454/161 |
| 5,862,677 A | | 1/1999 | Kim et al. | |
| 6,607,029 B2 | * | 8/2003 | Danieau | 165/203 |
| 6,739,388 B2 | | 5/2004 | Nakagawa et al. | |
| 7,886,814 B2 | * | 2/2011 | Yamamoto et al. | 165/202 |
| 7,913,746 B2 | * | 3/2011 | Hirooka et al. | 165/42 |
| 7,942,192 B2 | * | 5/2011 | Yamamoto et al. | 165/42 |
| 8,056,617 B2 | * | 11/2011 | Klassen et al. | 165/202 |
| 2002/0000314 A1 | * | 1/2002 | Danieau | 165/203 |

FOREIGN PATENT DOCUMENTS

| | | |
|---|---|---|
| JP | 10244824 A | 7/1997 |
| KR | 1998-046539 | 12/1996 |
| KR | 10-2001-0059264 | 7/2001 |
| KR | 10-2001-0059272 | 7/2001 |
| KR | 10-2001-0111646 | 12/2001 |

OTHER PUBLICATIONS

Definition of "console", The Free Dictionary, retrieved from http://www.thefreedictionary.com/console, Aug. 12, 2011.*

* cited by examiner

*Primary Examiner* — Ljiljana Ciric
(74) *Attorney, Agent, or Firm* — The Webb Law Firm

(57) ABSTRACT

A console air conditioner includes an evaporator, a heater, a face vent, a floor vent, and a vent door for controlling the opening degrees of the face vent and the floor vent and is installed in the console space between front seats of a vehicle. Both sides of the air mixing zone where a cool air passageway meets a warm air passageway in the console air conditioner are connected to a pillar duct extending toward the middle pillar of the vehicle. A temperature control door controls the opening degrees of a cool air passageway and a warm air passageway of the air conditioner case and is installed such that rotational trace of the temperature control door is overlapped with a pillar vent area that is defined between the pillar ducts.

6 Claims, 14 Drawing Sheets

CONSOLE AIR CONDITIONER FOR VEHICLE

TECHNICAL FIELD

The present invention relates to a console air conditioner for a vehicle. More specifically, the invention relates to a console air conditioner for a vehicle, in which pillar ducts are connected between an air mixing zone and the B-pillars at both sides of a vehicle body, the air mixing zone where a cool air passageway meets a warm air passageway, and the B-pillars being the second pillars from the front, thereby allowing for an independent control of air conditioning at the rear seat of a vehicle.

BACKGROUND ART

A conventional air conditioner for a vehicle is installed at the rear of the dash panel in order to provide a comfortable environment to passengers, and is constructed so as to discharge cool and warm air through a duct, the air being heat-exchanged by the air conditioner inside the vehicle, and the duct being connected to each vent of an air conditioner case. For example, in the air conditioner case is installed a defrost vent for discharging air toward the windows of the front seats, a face vent for discharging air toward the passengers in the front seats, and a front seat floor vent for discharging air toward the floor of the front seats.

Some of the air conditioners for a vehicle described above also can perform air conditioning of the rear seat. That is, in order to perform air conditioning of the rear seat, a floor vent for rear seat is more installed in the air conditioner case, and a rear duct can be connected to the floor vent for rear seat, the rear duct being extended along both sides of the vehicle floor to the B-pillars that are the second pillars from the front of the vehicle body. Therefore, air is directly discharged toward the rear seat of the vehicle through the rear duct, thereby improving air conditioning of the rear seat and defogging of the windows of the rear seat.

DISCLOSURE OF INVENTION

Technical Problem

However, in the technology described above, it is difficult to install the rear duct, and the air discharged through the rear duct cannot be independently controlled. That is, even in the case where there is no passenger in the rear seat, air is unnecessarily discharged to the rear seat, thereby wasting energy. In addition, in the process of flowing air to the B-pillar, temperature is lost, thereby degrading cooling/heating efficiency.

Considering the above problems, a console air conditioner is proposed that is installed in a console space between the front seats and can directly perform air conditioning of the rear seat.

For example, a console air conditioner is disclosed in Korean Patent Laid-open Publication No. 1998-46539, which controls the opening degrees of the air passageways of a heat core and an evaporator by using one damper installed at an air discharge port.

However, in the console air conditioner described above, since the air discharge port is located at the center inside of a vehicle, air cannot be efficiently controlled so as to be discharged toward the upper portion and the floor of the rear seat, and the performance of defogging the windows of the rear seat is decreased.

Also, in Korean Patent Laid-open Publication No. 2001-59264 proposed by the present, applicant, an auxiliary air conditioner is disclosed, which can control air to be discharged toward the upper portion and the floor of the rear seat by using the upper/lower vents whose opening degrees can be independently controlled.

However, in this auxiliary air conditioner having an auxiliary evaporator and an auxiliary heat core disposed in parallel, cooling water is supplied to the auxiliary heat core through a water valve, and doors control only the opening degrees of the vents in the same way as shown in the previous example, so that, when the cooling mode is changed to the full cooling mode, the change of the temperature is delayed by a remained cooling water, and hence a certain time delay is inevitable until cool air is discharged. In addition, since the auxiliary heat core is split into the left and right side, one outlet pipe and two inlet pipes must be connected lengthily from the front to the rear portions, thereby increasing mounting space and manufacturing costs. In addition, although the air discharge mode can be controlled upwardly and downwardly by the upper and lower vents, the control to the left and right cannot be independently performed in the same way as shown in the previous example.

Technical Solution

The present invention has been made in order to solve the above problems occurring in the prior art, and it is an object of the invention to provide a console air conditioner for a vehicle, in which pillar ducts are connected between an air mixing zone and the B-pillars at both sides of a vehicle body, the air mixing zone where a cool air passageway meets a warm air passageway, and the B-pillars being the second pillars from the front, thereby allowing an independent control of air conditioning at the rear seat of a vehicle.

In order to accomplish the above object, according to one aspect of the invention, there is provided a console air conditioner for a vehicle, the console air conditioner comprising an air conditioner case 130 installed in a console space between front seats FS of a vehicle, the air conditioner case having a blower 110 installed at an inlet thereof, and a face vent 134 and a floor vent 136 installed at an outlet thereof; an evaporator E and a heat core H installed at an inner air passageway of the air conditioner case; a temperature control door 142 for controlling the opening degrees of a cool air passageway P1 and a warm air passageway P2 of the air conditioner case; a vent door 138 for controlling the opening degrees of the face vent and floor vent; and a pillar duct 150 combined with pillar vents 148 formed at both sides of an air mixing zone MZ that is a space where the cool air passageway meets the warm air passageway, and extended toward a B-pillar B of a vehicle body.

According to the invention, the temperature control door is installed so as to control the opening degrees of the outlets of the cool air passageway and the warm air passageway, and an auxiliary door for controlling the opening degree of the warm air passageway may be further installed at the inlet of the warm air passageway.

In addition, the temperature control door is installed so as to control the opening degrees of the inlets of the cool air passageway and the warm air passageway, and an auxiliary door for controlling the opening degree of the warm air passageway may be further installed at the outlet of the warm air passageway.

In addition, the temperature control door can be configured so as to control not only the opening degrees of the inlets of the cool air passageway and the warm air passageway, but also the opening degree of the outlet of the warm air passageway. For example, in the case where the temperature control door is formed in a butterfly shape, the opening degrees of the inlets and outlets of the warm air passageway as well as the cool air passageway can be controlled at the same time.

In addition, the temperature control door is installed such that its rotary range is overlapped with a pillar vent area, so that in the case where the temperature control door is placed at the center of the pillar vent, cool air and warm air are preferably mixed with each other and flows into the pillar vent.

In addition, the inner air passageway of the air conditioner case is preferably divided by a partition into the left and right along the width direction, and each of the doors may be installed in pair so as to independently control the opening degrees of the inner air passageway of the air conditioner case divided into the left and right.

In addition, the blower is preferably formed of a double-suction type so as to suck air from both sides.

DESCRIPTION OF DRAWINGS

Further objects and advantages of the invention can be more fully understood from the following detailed description taken in conjunction with the accompanying drawings, in which.

MODE FOR INVENTION

The preferred embodiments of the present invention will be hereinafter described in detail with reference to the accompanying drawings.

First Embodiment

Referring to FIGS. 1 to 4*f*, a console air conditioner for a vehicle according to a first embodiment of the invention is explained.

Figure 1:
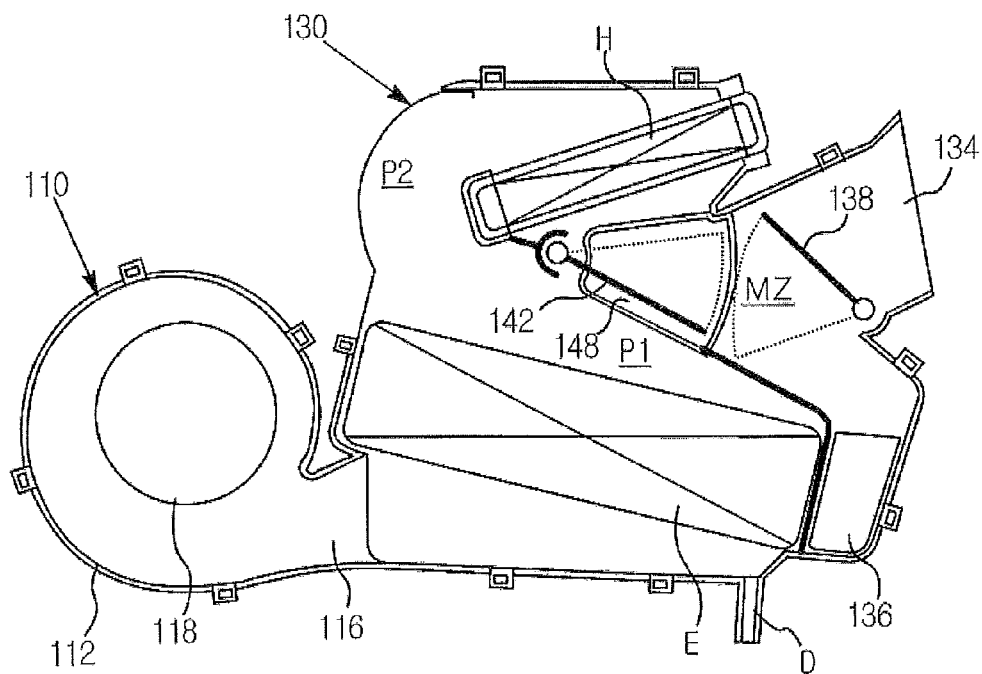
FIG. 1 is a vertical cross-sectional view showing a console air conditioner for a vehicle according to a first embodiment of the invention.

As shown in FIG. 1, the console air conditioner for a vehicle of this embodiment comprises an air conditioner case 130, and an evaporator E and a hearer core H installed at the inner air passageway of the air conditioner case 130.

The air conditioner case 130 can be installed in a console space between the front seats FS of a vehicle (refer to FIGS. 8 and 9), in which a blower 110 is installed at an inlet thereof, a face vent 134 for discharging air into the upper portion of the rear seat is installed at the outlet of the air conditioner case 130, and a floor vent 136 for discharging air into the bottom of the rear seat BS is installed in order.

Figure 2:
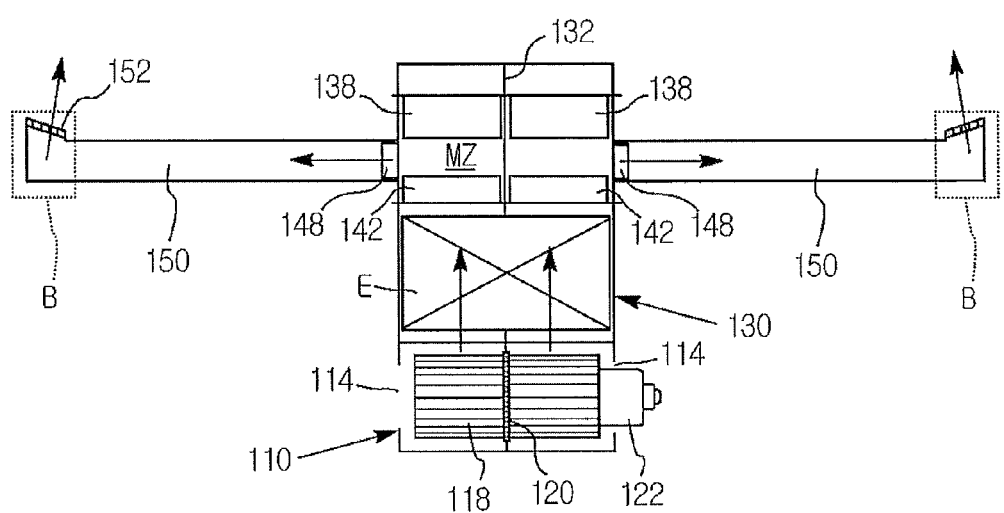
FIG. 2 shows a horizontal cross-sectional view explaining the air flow structure of a console air conditioner for a vehicle according to the first embodiment of the invention.

As shown in FIG. 2, the blower 110 has a double suction type blower case 112 formed with air inlets 114 at both sides. In addition, the hub 120 of a centrifugal fan 118 housed so as to be rotated in the blower case 112 and connected to a motor 122 is preferably installed at the center of the centrifugal fan 118. As shown in FIG. 1, a discharge port 116 of the blower 110 is formed at the lower portion.

Therefore, the evaporator E is horizontally disposed near the discharge port 116 of the blower 110 in a state where its rear end is slightly slanted downwardly, and the heat core H is horizontally disposed at the upper portion of the evaporator E in a state where its front end is slightly slanted downwardly. In addition, although they are not shown here, the evaporator E and the heat core H can be connected to an evaporator and a heat core respectively housed in the air conditioner for front seats that is installed behind the dash panel of a vehicle.

In addition, a temperature control door 142 for controlling the opening degrees of a cool air passageway P1 at the downstream side of the evaporator E and a warm air passageway P2 at the heat core H is installed inside the air conditioner case 100.

In addition, a vent door 138 for controlling the opening degrees of the face vent 134 and the floor vent 136 is installed at the air mixing zone MZ where the cool air passageway P1 meets the warm air passageway P2.

Figure 8:
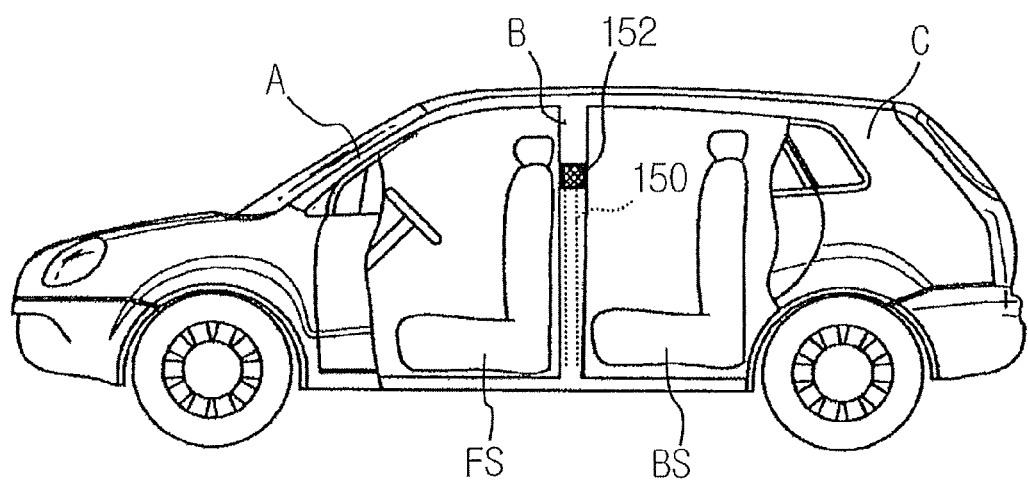
FIG. 8 is a side view of a vehicle showing the location of a vent grille of a pillar duct which configures a console air conditioner for a vehicle according to the invention.
Figure 9:
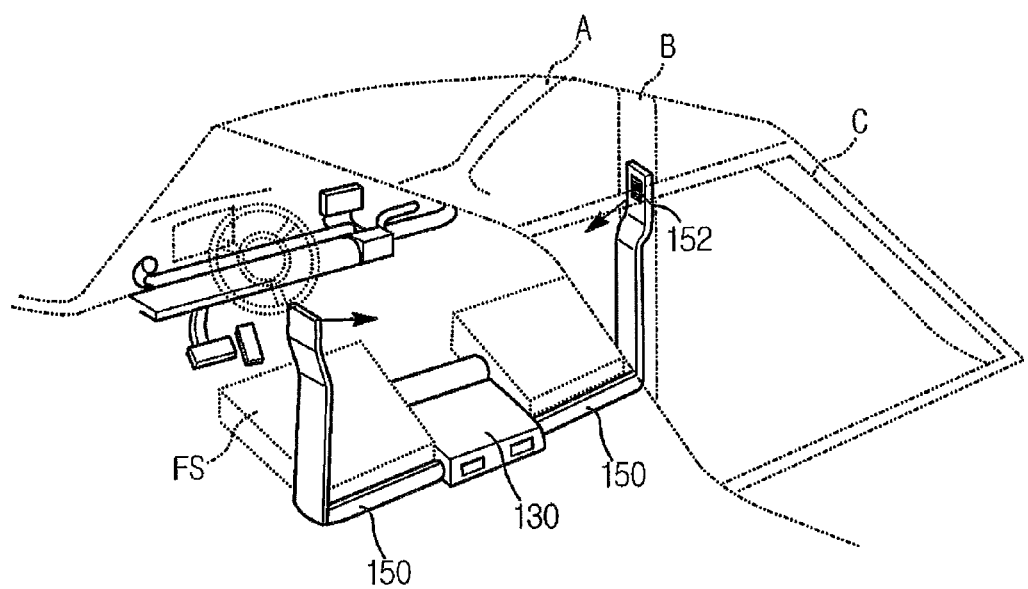
FIG. 9 is a perspective view schematically showing the state of installing a console air conditioner for a vehicle according to the invention.

According to the present embodiment, pillar vents 148 are formed at both sides of the air mixing zone MZ respectively. In addition, a pillar duct 150 is air-communicatively connected to each pillar vent 148, and, as shown in FIGS. 2, 8, and 9, is extended toward the B-pillar B, i.e. the second pillar from the front, among the pillars, i.e. A-pillar A, B-pillar B, and C-pillar C, of a vehicle body, and a vent grille 152 is installed at the end thereof. Therefore, the air introduced into the air mixing zone MZ can be discharged to the both sides of the upper portion of the rear seat BS through the pillar vents 148, pillar ducts 150, and vent grilles 152.

Then, as shown in FIG. 2, the inner air passageway of the air conditioner case 130 is divided by a partition 132 into the left and right along the width direction in order to independently control the air discharged into the left and right of the rear seat BS. In addition, the doors 138, 142 can be installed in pair so as to independently control the opening degree of the inner air passageway of the air conditioner case 130 divided into the left and right. That is, if each of the doors 138,138, and 142,142 is independently controlled by an actuator (not shown), the air discharged into both sides of the rear seat can be independently controlled.

Figure 3:
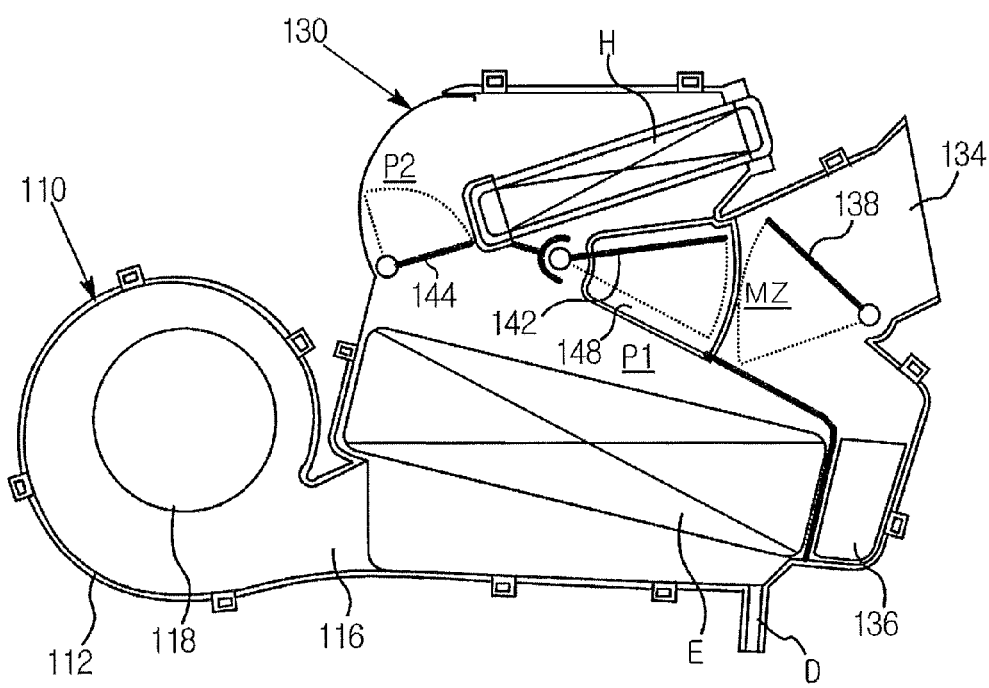
FIG. 3 is a cross-sectional view showing a modified example of a console air conditioner for a vehicle according to the first embodiment of the invention.

On the other hand, a modified example of a console air conditioner for a vehicle according to the first embodiment of the invention is shown in FIG. 3. In this example, the temperature control door 142 is installed so as to control the opening degrees of the outlets of the cool air passageway P1 and the warm air passageway P2, and an auxiliary door 144 for controlling the opening degree is further installed at the inlet of the warm air passageway P2. That is, when the cooling mode is in operation, the outlet of the warm air passageway P2 is blocked, and the cool air passageway P1 is opened by the temperature control door 142, and the inlet of the warm air passageway P2 is blocked by the auxiliary door 144. Thus, the cool air that flows into the air mixing zone through the cool air passageway P1 by way of the evaporator E is prevented from being affected by the heat from the heat core H, and the performance of the initial cooling can be improved. In addition, also in this case, the auxiliary doors 144 is preferably installed in pair so as to independently control the opening degrees of the inner air passageway of the air conditioner case 130 divided into the left and right.

According to the invention, the temperature control door 142 is installed such that its rotary range is overlapped with the pillar vent 148 area. Accordingly, in a state of controlling temperature by mixing cool and warm air, the temperature control door 142 can be placed at the center of the pillar vent 148. In this case, the air blown by the blower 110 flows toward the face vent 134, floor vent 136, and pillar vent 148. Specifically, some of the cool air passed through the evaporator E flows into the cool air passageway P1, and the other cool air flows into the warm air passageway P2. Accordingly, the cool and warm air are mixed and flow toward the pillar vent 148, and, according to the control of the opening degree of the vent door 138, flow toward the face vent 134 and the floor vent 136. Such air flows is guided by the temperature control door 142, and, specifically, by being the temperature control door 142 placed at the center of the pillar vent 148, the air flowing toward the pillar vent 148 can be smoothly guided.

On the other hand, the unexplained referential symbol D in FIGS. 1 and 3 denotes a discharge port for discharging the condensed water generated at the evaporator E.

Next, referring to FIGS. 4*a* to 4*f*, the operation of the console air conditioner for a vehicle according to the first embodiment of the invention that is configured as described above will be explained.

Figure 4A:
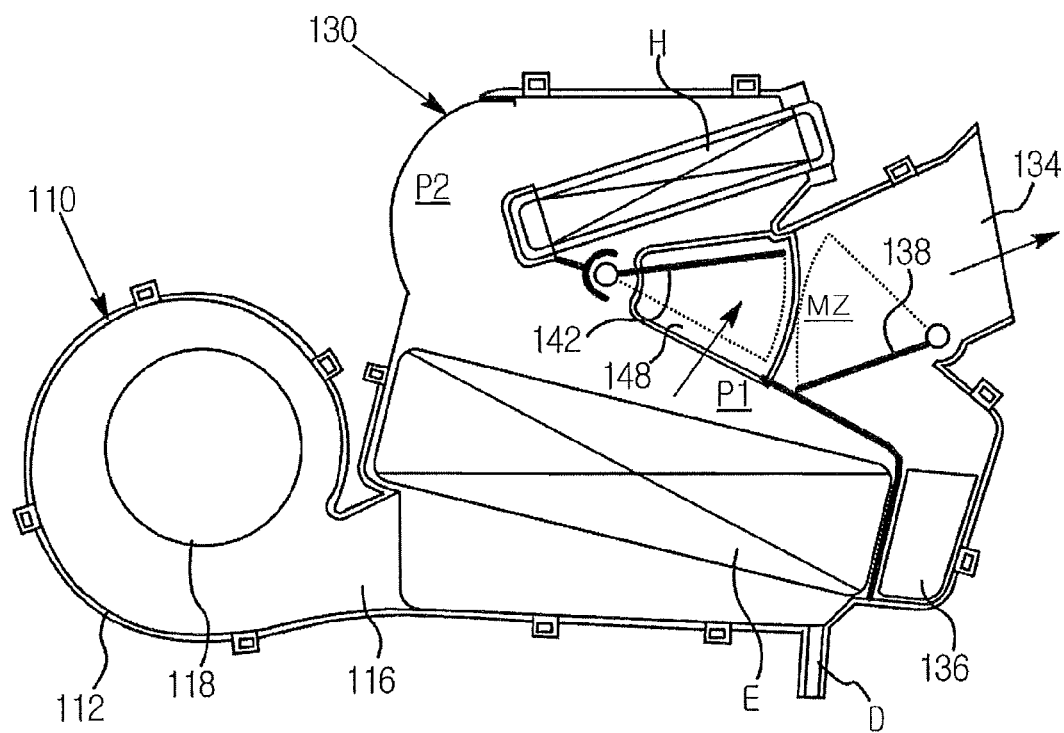
FIG. 4*a* is a cross-sectional view showing the operational state of a console air conditioner for a vehicle in the cooling face mode according to the first embodiment of the invention.

When the air conditioner operates in the cooling face mode, as shown in FIG. 4*a*, the temperature control door 142 opens the cool air passageway P1 and blocks the warm air passageway P2 at the same time, and the vent door 138 opens the face vent 134 and blocks the floor vent 136 at the same time.

Accordingly, the air blown by the blower 110 is changed to cool air by heat exchange while passing through the evaporator E. This cool air can be discharged to both sides of the upper portion of the rear seat BS through the air mixing zone MZ, face vent 134, and pillar duct 150 by way of the cool air passageway P1. Accordingly, air conditioning of the rear seat BS is evenly performed, and defogging performance on the windows of the rear seat is enhanced.

Figure 4B:
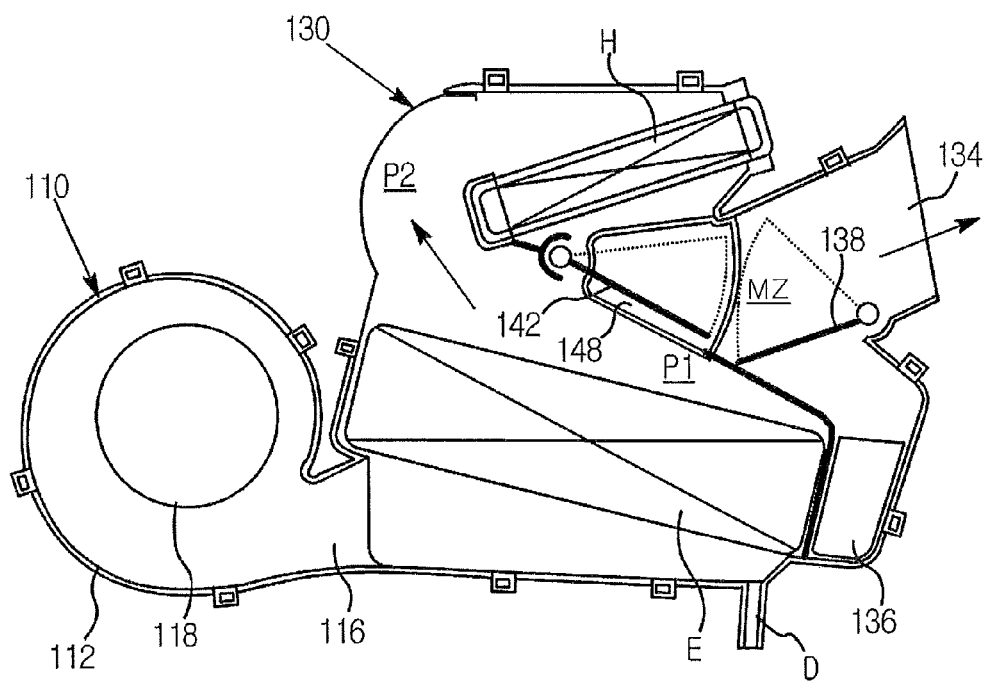
FIG. 4*b* is a cross-sectional view showing the operational state of a console air conditioner for a vehicle in the warming face mode according to the first embodiment of the invention.

In addition, when the air conditioner operates in the warming face mode, as shown in FIG. 4*b*, the temperature control door 142 opens the warm air passageway P2 and blocks the cool air passageway P1 at the same time, and the vent door 138 opens the face vent 134 and blocks the floor vent 136 at the same time. In addition, the operation of the cooling cycle performed by the evaporator E is stopped.

Accordingly, the air blown by the blower 110 passes through the warm air passageway P2 by way of the evaporator E, and thus is changed to warm air by heat exchange while passing through the heat core H. This warm air can be discharged to both sides of the upper portion of the rear seat BS through the air mixing zone MZ, face vent 134, and pillar duct 150 by way of the warm air passageway P2. Accordingly, warming of the rear seat BS is evenly performed, and defogging performance on the windows of the rear seat is enhanced.

Figure 4C:
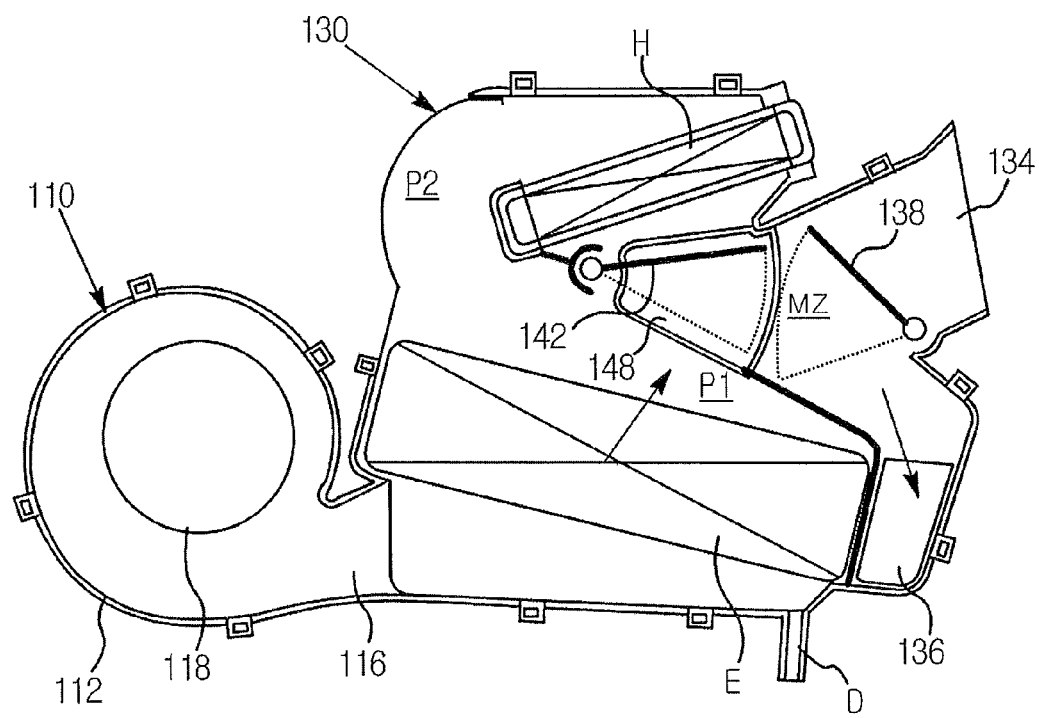
FIG. 4*c* is a cross-sectional view showing the operational state of a console air conditioner for a vehicle in the cooling floor mode according to the first embodiment of the invention.

In addition, when the air conditioner operates in the cooling floor mode, as shown in FIG. 4*c*, the temperature control door 142 opens the cool air passageway P1 and blocks the warm air passageway P2 at the same time, and the vent door 138 opens the floor vent 136 and blocks the face vent 134 at the same time.

Accordingly, the air blown by the blower 110 is changed to cool air by heat exchange while passing through the evaporator E. This cool air can be discharged to the upper portion and the floor of the rear seat BS through the air mixing zone MZ, pillar duct 150, and floor vent 136 by way of the cool air passageway P1, thereby evenly performing air conditioning of the rear seat BS.

Figure 4D:
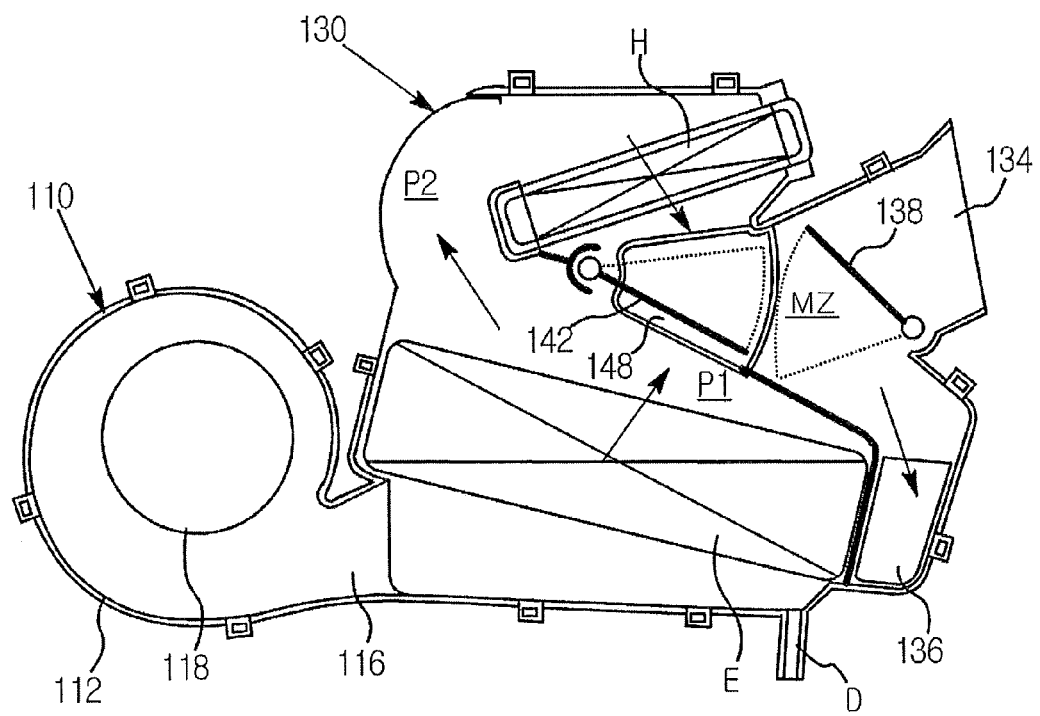
FIG. 4*d* is a cross-sectional view showing the operational state of a console air conditioner for a vehicle in the warming floor mode according to the first embodiment of the invention.
Figure 4E:
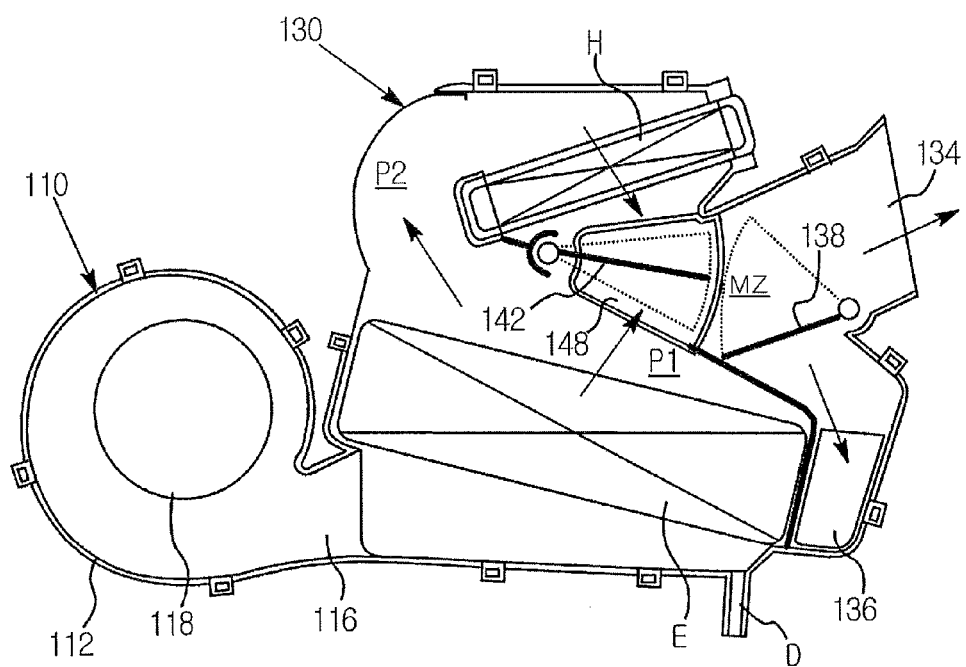
FIG. 4*e* is a cross-sectional view showing the state of controlling temperature of a console air conditioner for a vehicle in the face mode according to the first embodiment of the invention.
Figure 4F:
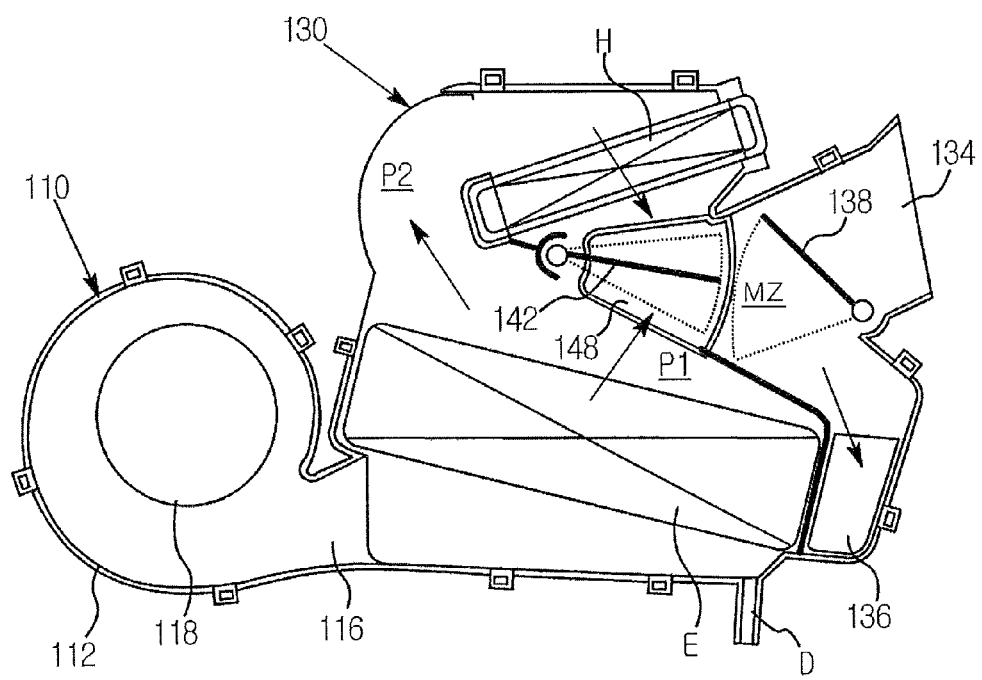
FIG. 4*f* is a cross-sectional view showing the state of controlling temperature of a console air conditioner for a vehicle in the floor mode according to the first embodiment of the invention.

In addition, when the air conditioner operates in the warming floor mode, as shown in FIG. 4*d*, the temperature control door 142 opens the warm air passageway P2 and blocks the cool air passageway P1 at the same time, and the vent door 138 opens the floor vent 136 and blocks the face vent 134 at the same time. In addition, the operation of the cooling cycle performed by the evaporator E is stopped.

Accordingly, the air blown by the blower 110 passes through the warm air passageway P2 by way of the evaporator E, and thus is changed to warm air by heat exchange while passing through the heat core H. This warm air can be discharged to the upper portion and the floor of the rear seat BS through the air mixing zone MZ, the face vent 134, and the pillar duct 150 by way of the warm air passageway P2, thereby evenly performing warming of the rear seat BS.

In addition, in the cooling face mode among the modes described above, as shown in FIG. 4*e*, if the temperature control door 142 is turned to the neutral position, and opens a portion of each cool air passageway P1 and warm air passageway P2 toward the air mixing zone MZ, the cool air that has passed the evaporator E is mixed with the warm air that has passed the heat core H, and can be discharged to both sides of the upper portion of the rear seat BS through face vent 134 and pillar duct 150, thereby appropriately controlling cooled temperature of the rear seat BS. The cooled temperature can be appropriately controlled according to the opening degrees of the cool air passageway P1 and the warm air passageway P2.

In addition, in the warming face mode among the modes described above, as shown in FIG. 4*f*, if the temperature control door 142 is turned to the neutral position, and opens a portion of each cool air passageway P1 and warm air passageway P2 toward the air mixing zone MZ, the temperature of the air of the rear seat BS warmed by the air discharged through pillar duct 150 and floor vent 136 can be appropriately controlled according to the opening degrees of the cool air passageway P1 and warm air passageway P2.

Second Embodiment

Figure 5:
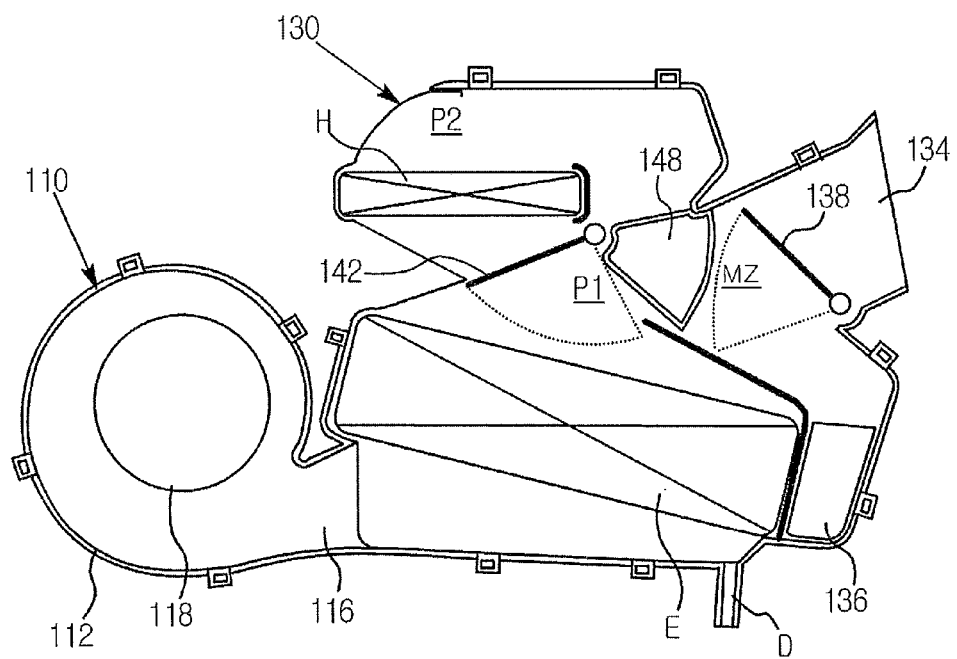
FIG. 5 is a cross-sectional view showing a console air conditioner for a vehicle according to a second embodiment of the invention.
Figure 6:
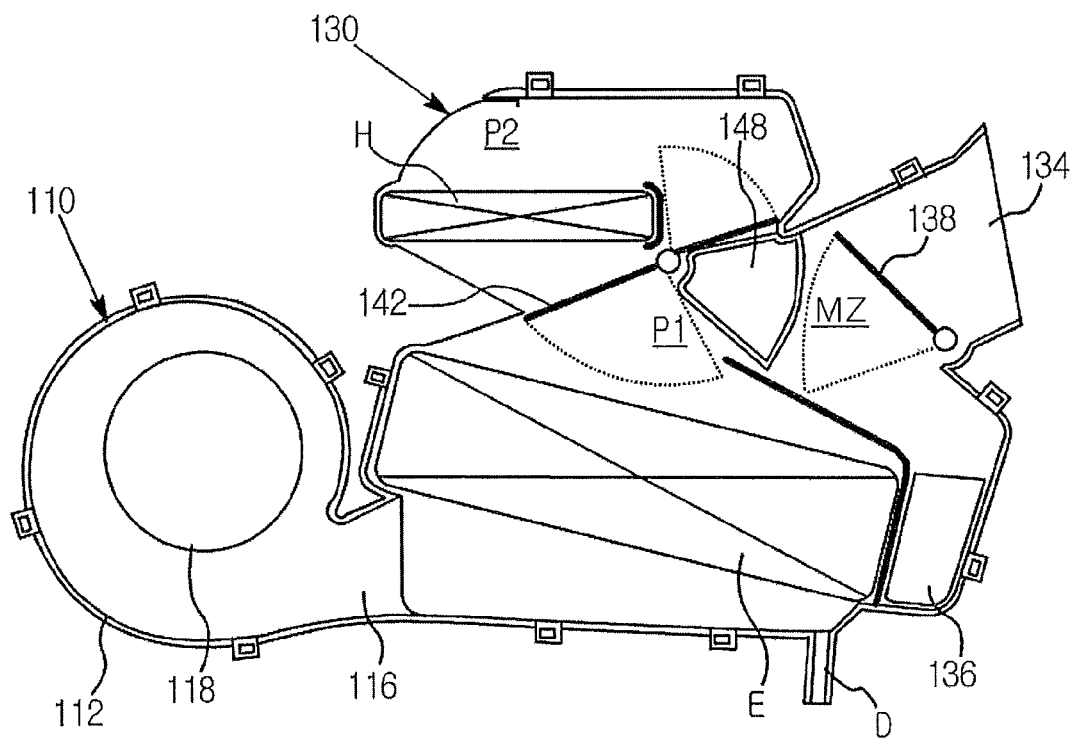
FIG. 6 is a cross-sectional view showing a modified example of a console air conditioner for a vehicle according to the second embodiment of the invention.
Figure 7:
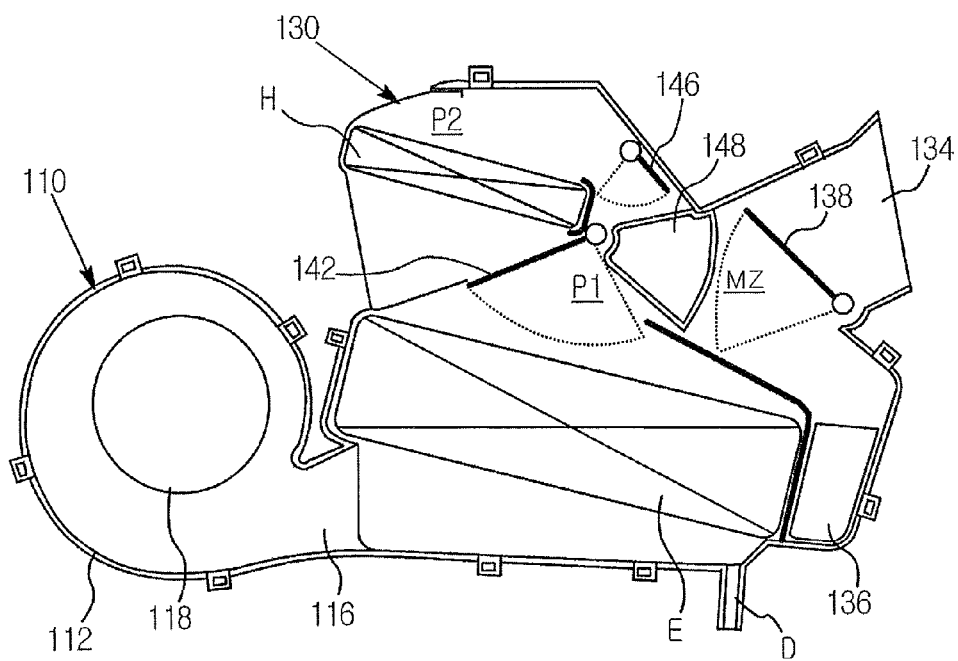
FIG. 7 is a cross-sectional view showing another modified example of a console air conditioner for a vehicle according to the second embodiment of the invention.

Referring to FIGS. 5 to 7, a console air conditioner for a vehicle according to the second embodiment of the invention is explained.

The console air conditioner for a vehicle of this embodiment has the same configuration as that of the first embodiment, except that the temperature control door 142 is different from the structure of the first embodiment.

That is, in the air conditioner of this embodiment, as shown in FIG. 5, the temperature control door 142 is installed so as to control the inlet of the warm air passageway P2 and the opening degree of the cool air passageway P1.

In addition, as shown in FIG. 6, the temperature control door 142 can be formed so as to control the outlet of the warm air passageway P2 at the same time. For example, in the case where the temperature control door 142 is formed in a butterfly shape, the opening degree of the outlet of the warm air passageway P2 can be controlled at the same time.

In addition, without adopting the butterfly shaped temperature control door 142, as shown in FIG. 7, an auxiliary door 146 for controlling the opening degree of the outlet of the warm air passageway P2 can be further installed at the outlet of the warm air passageway P2 in connection with the temperature control door 142 that controls the inlet of the warm air passageway P2 and the opening degree of the cool air passageway P1. In addition, also in this case, the auxiliary door 146 is preferably installed in pair so as to independently control the opening degrees of the inner air passageway of the air conditioner case 130 that is divided into the left and right.

That is, in the cooling mode, the inlet of the warm air passageway P2 is blocked by the temperature control door 142, and the outlet of the warm air passageway P2 is blocked by the auxiliary door 146 at the same time, or the inlet and the outlet of the warm air passageway P2 are blocked at the same time by the butterfly shaped temperature control door 142, so that the cool air flowing through the cool air passageway P1 is uninfluenced by the heat core H.

According to the console air conditioner for a vehicle according to the invention configured as described above, air can be discharged from both B-pillars B, i.e. the second pillars from the front of a vehicle body, to both sides of the upper portion of the rear seat BS, so that the air conditioning performance of the rear seat BS of the vehicle and the defogging performance on the windows of the rear seat BS can be improved.

In addition, the inner air passageway of the air conditioner case 130 is divided by a partition 132 into the left and right and can be independently controlled, so that air conditioning of the rear seat BS can be more effectively performed.

INDUSTRIAL APPLICABILITY

The present invention provides a console air conditioner for a vehicle, in which a pillar duct is connected between an air mixing zone, where a cool air passageway meets a warm air passageway, and a B-pillar that is the second pillar of a vehicle body from the front, thereby allowing an independent control of air conditioning at the rear seat. Since air can be discharged to both sides of the upper portion of the rear seat, the air conditioning and defogging performance of the rear seat can be improved. In addition, the inner air passageway of the air conditioner case is divided into the left and right compartments, and can be independently controlled, so that air conditioning of the rear seat can be effectively performed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A console air conditioner for a vehicle, the console air conditioner comprising:
    an air conditioner case installed in a console space between front seats of a vehicle, the air conditioner case having a blower installed at an inlet of the air conditioner case, and a face vent and a floor vent installed at an outlet of the air conditioner case;
    an evaporator and a heater core installed at an inner air passageway of the air conditioner case;
    a temperature control door for controlling the opening degrees of a cool air passageway and a warm air passageway of the air conditioner case;
    a vent door for controlling the opening degrees of the face vent and floor vent; and
    a pillar duct respectively in direct connection with a pillar vent formed at either side of an air mixing zone that is a space where the cool air passageway meets the warm air passageway, and extended toward a B-pillar of a vehicle body,
    wherein the air flowing into the mixing zone is directly discharged to the pillar duct,
    wherein the temperature control door is installed such that a rotational trace of the temperature control door is overlapped with a pillar vent area, so that when the temperature control door is placed at a center of the pillar vent area, cool air and warm air are mixed with each other in the mixing zone and flow through the pillar vent into the pillar duct.

2. The air conditioner according to claim 1, wherein the temperature control door is installed so as to control an outlet of the warm air passageway and the opening degree of the cool air passageway, and an auxiliary door for controlling the opening degree of the warm air passageway is further installed at an inlet of the warm air passageway.

3. The air conditioner according to claim 1, wherein the temperature control door is installed so as to control the inlet of the warm air passageway and the opening degree of the cool air passageway, and an auxiliary door for controlling the opening degree of the warm air passageway is further installed at the outlet of the warm air passageway.

4. The air conditioner according to claim 1, wherein the temperature control door is installed so as to control the inlet and the outlet of the warm air passageway, and the opening degree of the cool air passageway at the same time.

5. The air conditioner according to claim 1, wherein the inner air passageway of the air conditioner case is divided by a partition into the left and right along a width direction, and each of the doors is installed in pair so as to independently control the opening degrees of the inner air passageway of the air conditioner case divided into the left and right.

6. The air conditioner according to claim 5, wherein the blower is formed of a double-suction type so as to suck air from both sides.

* * * * *